United States Patent
Whitehill et al.

(10) Patent No.: US 12,384,710 B2
(45) Date of Patent: Aug. 12, 2025

(54) THERMOMECHANOCHEMICAL WASTE TREATMENT

(71) Applicant: United States Government, as represented by the Administrator of the U.S. EPA, Washington, DC (US)

(72) Inventors: Andrew Richard Whitehill, Durham, NC (US); Eben Daniel Thoma, Cary, NC (US); Paul Lemieux, Cary, NC (US); Mark Higuchi, Chapel Hill, NC (US); Chelsea Berg, Durham, NC (US); Brian K. Gullett, Durham, NC (US); Erin Shields, Cary, NC (US)

(73) Assignee: UNITED STATES GOVERNMENT, AS REPRESENTED BY THE ADMINISTRATOR OF THE U.S. EPA, Washington, DC (US)

( * ) Notice: Subject to any disclaimer, the term of this patent is extended or adjusted under 35 U.S.C. 154(b) by 0 days.

(21) Appl. No.: 18/656,518

(22) Filed: May 6, 2024

(65) Prior Publication Data

US 2024/0294413 A1  Sep. 5, 2024

Related U.S. Application Data

(62) Division of application No. 17/449,439, filed on Sep. 29, 2021, now Pat. No. 12,006,238.

(51) Int. Cl.
*C02F 11/18* (2006.01)
*B09B 3/40* (2022.01)
(Continued)

(52) U.S. Cl.
CPC ............... *C02F 11/18* (2013.01); *B09B 3/40* (2022.01); *C02F 11/004* (2013.01); *C02F 11/13* (2019.01);
(Continued)

(58) Field of Classification Search
CPC ......... C02F 11/18; C02F 11/13; C02F 11/004; C02F 11/00; C02F 2101/36; C02F 2303/26; B09B 3/40; B09B 3/00; B09B 3/0083
(Continued)

(56) References Cited

U.S. PATENT DOCUMENTS

| 8,888,029 B2 | 11/2014 | Black et al. | |
| 2013/0099033 A1* | 4/2013 | Black | B02C 21/00 241/98 |
| 2014/0197257 A1* | 7/2014 | Foucher | B02C 17/205 241/98 |

FOREIGN PATENT DOCUMENTS

| GB | 231701 | * 6/1924 | ............. B02C 21/00 |
| GB | 231701 A | 4/1925 | |

OTHER PUBLICATIONS

Zhang, Q. et al., "Mechanochemical Solid-Phase Reaction between Polyvinylidene Fluoride and Sodium Hydroxide," Journal of Applied Polymer Science, vol. 81, No. 9, Aug. 2001, 4 pages.
(Continued)

*Primary Examiner* — Akash K Varma
(74) *Attorney, Agent, or Firm* — McCoy Russell LLP (57) ABSTRACT

Apparatus and systems are provided for processing PFAS-contaminated waste via thermomechanochemical (TMC) processing. In one example, a system may include a TMC processing chamber including a milling system and coupled to a heating system, the heating system configured to co-operate with the milling system to process the waste material. A plurality of containers including the waste material in one or more of a liquid-solid state, a semi-wet or slurry solid state, and a dry solid state are coupled to the TMC chamber.

18 Claims, 4 Drawing Sheets

(51) Int. Cl.
*C02F 11/00* (2006.01)
*C02F 11/13* (2019.01)
*C02F 101/36* (2006.01)

(52) U.S. Cl.
CPC ...... *C02F 2101/36* (2013.01); *C02F 2303/26* (2013.01)

(58) Field of Classification Search
USPC .......................................................... 210/739
See application file for complete search history.

(56) References Cited

OTHER PUBLICATIONS

Zhang, K. et al., "Destruction of Perfluorooctane Sulfonate (PFOS) and Perfluorooctanoic Acid (PFOA) by Ball Milling," Environmental Science & Technology, vol. 47, No. 12, May 15, 2013, 7 pages.

Yan, X. et al., "Mechanochemical destruction of a chlorinated polyfluorinated ether sulfonate (F-53B, a PFOS alternative) assisted by sodium persulfate," RSC Advances, vol. 5, No. 104, Oct. 6, 2015, 6 pages.

Qu, J. et al., "Decompostion pathways of polytetrafluoroethylene by co-grinding with strontium/calcium oxides," Environmental Technology, vol. 38, No. 11, Jun. 2017, Available Online Sep. 23, 2016, 8 pages.

Cagnetta, G. et al., "Mechanochemical destruction of perfluorinated pollutants and mechanosynthesis of lanthanum oxyfluoride: A Waste-to-Materials process," Chemical Engineering Journal, vol. 316, May 15, 2017, 13 pages.

Lu, M. et al., "Mechanochemical mineralization of "very persistent" fluorocarbon surfactants—6:2 fluorotelomer sulfonate (6:2FTS) as an example," Scientific Reports, vol. 7, No. 17180, Dec. 7, 2017, 10 pages.

Lv, H. et al., "Alumina-mediated mechanochemical method for simultaneously degrading perfluorooctanoic acid and synthesizing a polyfluoroalkene," Green Chemistry, vol. 20, No. 11, Apr. 25, 2018, 8 pages.

Cagnetta, G. et al., "A mini-review on mechanochemical treatment of contaminated soil: From laboratory to large-scale," Critical Reviews in Environmental Science and Technology, vol. 48, No. 7-9, Aug. 10, 2018, 50 pages.

Ul'Yanov, A. et al., "Study of Products of the Mechanochemical Activation of Teflon in a Mixture with Metals by Chromatography-Mass Spectrometry and Thermodesorption Mass Spectrometry," vol. 74, No. 5, May 2019, 9 pages.

Wang, N. et al., "Complete Defluorination and Mineralization of Perfluorooctanoic acid by a Mechanochemical Method Using Alumina and Persulfate," Environmental Science & Technology, vol. 53, No. 14, May 31, 2019, 12 pages.

Crownover, E. et al., "Perfluoroalkyl and polyfluoroalkyl substances thermal desorption evaluation," Remediation Journal, vol. 29, No. 4, Sep. 11, 2019, 5 pages.

Xiao, F. et al., "Thermal Stability and Decomposition of Perfluoroalkyl Substances on Spent Granular activated Carbon," Environmental Science & Technology Letters, vol. 7, No. 5, Apr. 20, 2020, 8 pages.

Sörengård, M. et al., "Thermal desorption as a high removal remediation technique for soils contaminated with per- and polyfluoroalkyl substances (PFASs)," PLoS One, vol. 15, No. 6, Jun. 25, 2020, 10 pages.

Roesch, P. et al., "Reductive Defluorination and Mechanochemical Decomposition of Per- and Polyfluoroalkyl Substances (PFASs): From Present Knowledge to Future Remediation Concepts," International Journal of Environmental Research and Public Health, vol. 17, No. 19, Oct. 3, 2020, 22 pages.

Turner, L. et al., "Mechanochemical remediation of perfluorooctanesulfonic acid (PFOS) and perfluorooctanoic acid (PFOA) amended sand and aqueous film-forming foam (AFFF) impacted soil by planetary ball milling," Science of the Total Environment, vol. 765, No. 142722, Apr. 15, 2021, Available Online Oct. 6, 2020, 10 pages.

Xiao, F. et al., "Thermal Decomposition of Anionic, Zwitterionic, and Cationic Polyfluoroalkyl Substances in Aqueous Film-Forming Foams," Environmental Science & Technology, vol. 55, No. 14, Jul. 8, 2021, 10 pages.

* cited by examiner

THERMOMECHANOCHEMICAL WASTE TREATMENT

CROSS REFERENCE TO RELATED APPLICATIONS

The present application is a divisional of U.S. Non-Provisional patent application Ser. No. 17/449,439, entitled "THERMOMECHANOCHEMICAL WASTE TREATMENT", and filed on Sep. 29, 2021. The entire contents of the above-listed application are hereby incorporated by reference for all purposes.

ACKNOWLEDGMENT OF GOVERNMENT SUPPORT

This invention was made with government support from the United States Environmental Protection Agency through its Office of Research and Development. The government has certain rights in the invention.

FIELD

The present description relates generally to systems and apparatus for a thermomechanochemical (TMC) waste treatment system for treatment of waste including pollutants such as Per- and Polyfluorinated Substances (PFAS).

BACKGROUND AND SUMMARY

Per- and polyfluoroalkyl substances (PFAS) are a group of synthetic chemicals that includes perfluorooctanoic acid (PFOA), perfluorooctane sulfonic acid (PFOS), and GenX, among others. PFAS have been manufactured and used in a variety of industries around the globe, including in the United States since the 1940s. Many chemicals in this group, including perfluorooctane sulfonic acid (PFOS) and perfluorooctanoic acid (PFOA), are of concern and are desired to be sustainably removed from waste material.

Additionally, while there are laws regulating manufacturing and importing of products containing PFAS (including the Safe Water Drinking Act, the Toxic Substances Control Act, the Comprehensive Environmental Response, Compensation, and Liability Act, and the Clean Air Act), PFAS already present in the environment is of concern. For example, PFAS moves through soils and contaminates drinking water sources, and builds up (bioaccumulates) in fish and wildlife. For example, PFAS have been found in rivers and lakes and in many types of animals on land and in the water. Additionally, PFAS may be found in landfills, wastewater lagoons, wastewater treatment facilities, and biosolid application areas. For example, PFAS may be contained in landfill leachate, and the landfill leachate may serve the main pathway for PFAS to exit municipal solid waste landfills. As PFAS poses several health risks to public health, methods for processing waste containing PFAS are desirable.

Prior methods for removing PFAS from various media may include, for example, in situ thermal treatment of PFAS in soils at low temperatures ($<\approx 300°$ C.) or at higher temperatures through a variety of mechanisms. High temperature thermal treatment may not be desirable for certain waste feedstocks (e.g., the beneficial use potential for land application of biosolids may be reduced by high temperature thermal treatment). Additionally, low temperature embodiments of thermal treatment are not time efficient (requiring days), and is not efficacious. It is also known that mechanochemical treatment, such as ball milling with added processing reagents, can destroy pollutants, including PFAS (recent demonstration) in dry waste. However, the above described methods may not be universally applicable and/or customizable to a plurality of waste media, including solid-liquid waste, semi-wet or slurry solid waste, and dry solid waste.

In one example, the issues described above may be addressed by a thermomechanochemical (TMC) chamber including a milling system, a heating system coupled to the TMC chamber, the heating system configured to co-operate with the milling system to process the waste material, and a plurality of containers coupled to the TMC chamber at a first end, the plurality of containers including the waste material in one or more of a liquid-solid state, a semi-wet or slurry solid state, and a dry solid state. In this way, PFAS may be removed from a plurality of waste media in a waste feedstock, allowing for systematic and customizable removal of PFAS for more efficient and efficacious waste processing. Additionally, other pollutants may be removed as part of the same process, creating added benefit.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and apparatus for thermomechanochemical (TMC) waste treatment for treatment of PFAS (and other pollutant)-affected waste feedstocks. In an exemplary embodiment, such as a TMC waste treatment systems of FIG. 1 and/or FIG. 2, TMC waste treatment may reduce excess levels of PFAS in PFAS-contaminated waste in order to achieve compliance with federal, state, or local regulations. The TMC waste treatment system may remove PFAS from a variety of different types of waste feedstocks, including dry solid waste, semi-wet or slurry solid waste, and liquid-solid waste, customizing process parameters during processing for each type of waste. A method for operating the TMC waste treatment system is provided in FIG. 3.

PFAS-contaminated waste feedstocks may be processed via a variety of methods, depending on the incoming waste feedstock. In one example, PFAS-contaminated waste, such as in a solid or semi-solid matrix, may be broken down via a mechanochemical degradation (MCD) process, such as via a deaggregator. Examples of deaggregator include free moving devices such as milling balls or stationary devices such as blocks, blades, etc. During ball milling, deaggregators (such as the milling balls) are included in a waste processing chamber (also referred to herein as the TMC chamber), e.g. a cylindrical chamber, whereby the chamber is rotated along a central axis in order to provide milling of the PFAS-contaminated waste with the deaggregators. For types of waste on a thermal end of a processing spectrum, the TMC chamber may operate without deaggregators, and may use some other method to mechanically process (mix/grind) the material. For example, biosolids processing mechanical action may designed to break open cells to facilitate vapor removal via another mechanical processing method, such as via milling blades included within the TMC chamber. Collisions of the PFAS-contaminated material with the deaggregators increases the surface area of exposure of PFAS contained within the material, may further break down PFAS, and may destroy a non-volatile fraction of PFAS contained within the PFAS-contaminated material. Furthermore, reagents, including, but not limited to, silica ($SiO_2$), potassium hydroxide (KOH), calcium oxide (CaO), and/or calcium hydroxide ($Ca(OH)_2$) may be added to the TMC chamber in order to further react with PFAS contained therein. These reagents help produce highly reactive conditions for reaction with fluorine atoms in PFAS. The crystalline structures of the reagents are crushed and sheared by high energy impacts from the deaggregators (such as stainless-steel milling balls) in the rotating TMC chamber. Such collisions may produce radicals, electrons, heat, and even plasma that react with PFAS to produce inorganic fluoride compounds and graphite.

As an example, high energy milling of PFAS-contaminated waste with stainless steel balls and common sand (SiO2) as a co-milling reagent can cause cleavage of the Si—O bonds in the sand particles, forming free radicals. These free radicals liberate fluorine from the PFAS, breaking down the PFAS and producing Si—F. Thus, high energy ball milling of dried PFAS-contaminated materials with common sand can destroy the PFAS, and convert the fluorine to harmless inorganic fluorine (surface Si—F bonds).

In order for ball milling with or without reagents to be effective, the PFAS-contaminated waste included in the milling process is desired to be in dry waste form. For PFAS-contaminated waste such as biosolids that form semi-liquid, slurry, or wet solid (SSS) waste, heating may be applied to the waste in order to remove the PFAS. During heating, the PFAS may volatilize off of the biosolid, and the volatilized PFAS, as part of a gaseous byproduct, may be further processed via an emission control system. For example, thermal treatment of PFAS in soils can be accomplished in situ or ex situ at low temperatures (<≈300° C.) or at higher temperatures through a variety of mechanisms. High temperature thermal treatment is not desirable for certain waste feedstocks (e.g., beneficial use potential for land application of biosolids is ruined by high temperature thermal treatment). Low temperature embodiments of thermal treatment are not time efficient (requiring days) and may not be efficacious. The combination of optimal mechano-chemical action (using deaggregators) and optimal thermal profile (with or without reagents) may produce the most efficient process throughput, removal/destruction efficacy, and potential for material beneficial reuse.

In the embodiments described herein, both the MCD and thermal treatment is combined into a thermomechanochemical (TMC) waste treatment system for treating, in a flexible and customizable manner, a variety of waste feedstocks, such as dry solid and SSS waste feedstocks. The TMC waste treatment system may include a feeding system for waste material, including a plurality of subsystems configured to reduce moisture in the waste material prior to entering a TMC chamber, a plurality of sensors to estimate input pollutant levels and processing conditions, the TMC chamber including a plurality of deaggregators, a heating system configured to impart thermal energy to the TMC chamber, a processing reagent subsystem configured to deliver co-milling reagents to the TMC chamber, and a disposal system configured to remove gaseous and non-gaseous byproducts remaining after treatment of the waste material at the TMC chamber.

In such embodiments described herein, waste may come in a variety of available waste feedstocks, with each waste feedstock variety being pre-processed separately before being sent to main chamber for TMC treatment. For example, the pre-processing system may include several subsystems, including a first subsystem for liquid/solid separation to partition liquid from SSS waste. A second subsystem for storage (for later treatment) or direct processing of liquid streams as part of the process may be included. For SSS waste, a third subsystem dryer may be included for drying semi-wet or slurry solid waste prior to TMC treatment. For dry waste, a fourth subsystem bypass may be included to allow direct operation on dry waste that does not use liquid separation or drying. A fifth subsystem for adding processing reagent may be included, the fifth subsystem allowing storage and addition of specialized materials (e.g. reagents) to the SSS or dry waste feedstocks that will aid in the removal or destruction of PFAS during TMC treatment.

Following pre-processing via the aforementioned variety of pre-processing subsystems, the one or more waste feedstocks may be added, along with the reagents, to a TMC treatment subsystem. The TMC treatment subsystem may include removing and/or destroying PFAS and/or other pollutants from the SSS or dry waste feedstock via a heating system and via milling of waste material with deaggregators and added co-milling reagents within the TMC chamber. The subsystem produces one or more of the following effects: final drying, mixing and deagglomeration to expose surface area, thermal evolution (cleaning) of pollutants, and/or mechanochemical destruction of pollutants, with or without processing reagents.

Following treatment within the TMC subsystem, gaseous byproducts generated during the TMC processing which may contain PFAS and other pollutants may be treated via an emission control subsystem. The emission control subsystem may use a low pressure suction to capture the gaseous byproducts and control or destroy volatilized PFAS that may be released by utilizing one or more air pollutant emission control devices (e.g., a thermal oxidizer (TO), wet scrubber, cyclone, and/or sorbent media to capture pollutant, such as granular activated carbon (GAC)), with the optional processing feature of destruction of the spent filter (e.g., GAC) in the TMC system.

In this way, by sorting waste into different waste feedstocks (including liquid-solid waste, dry solid waste, and semi-wet or slurry solid waste), applying pre-processing to each of the waste feedstocks, treating the pre-processed waste feedstocks via TMC treatment, a plurality of different waste feedstocks may be processed to remove PFAS therein. The technical effect of combining thermal treatment and mechano-chemical treatment to the pre-processed waste feedstocks is that a synergistic approach offered by TMC provides cost effective treatment of the waste feedstocks. The mechanical aspects assist in the thermal processing, and the thermal processing augments the mechanochemical kinetics with select catalytic regents and co-milling reagents. Waste material, e.g., biosolids formed from sewage and contaminated soils, may be processed such that the solid byproduct after treatment may be reusable. Additionally, by containing and processing the gaseous byproducts containing volatilized PFAS via an emission control system, volatilized PFAS may be either absorbed or destroyed.

Figure 1:
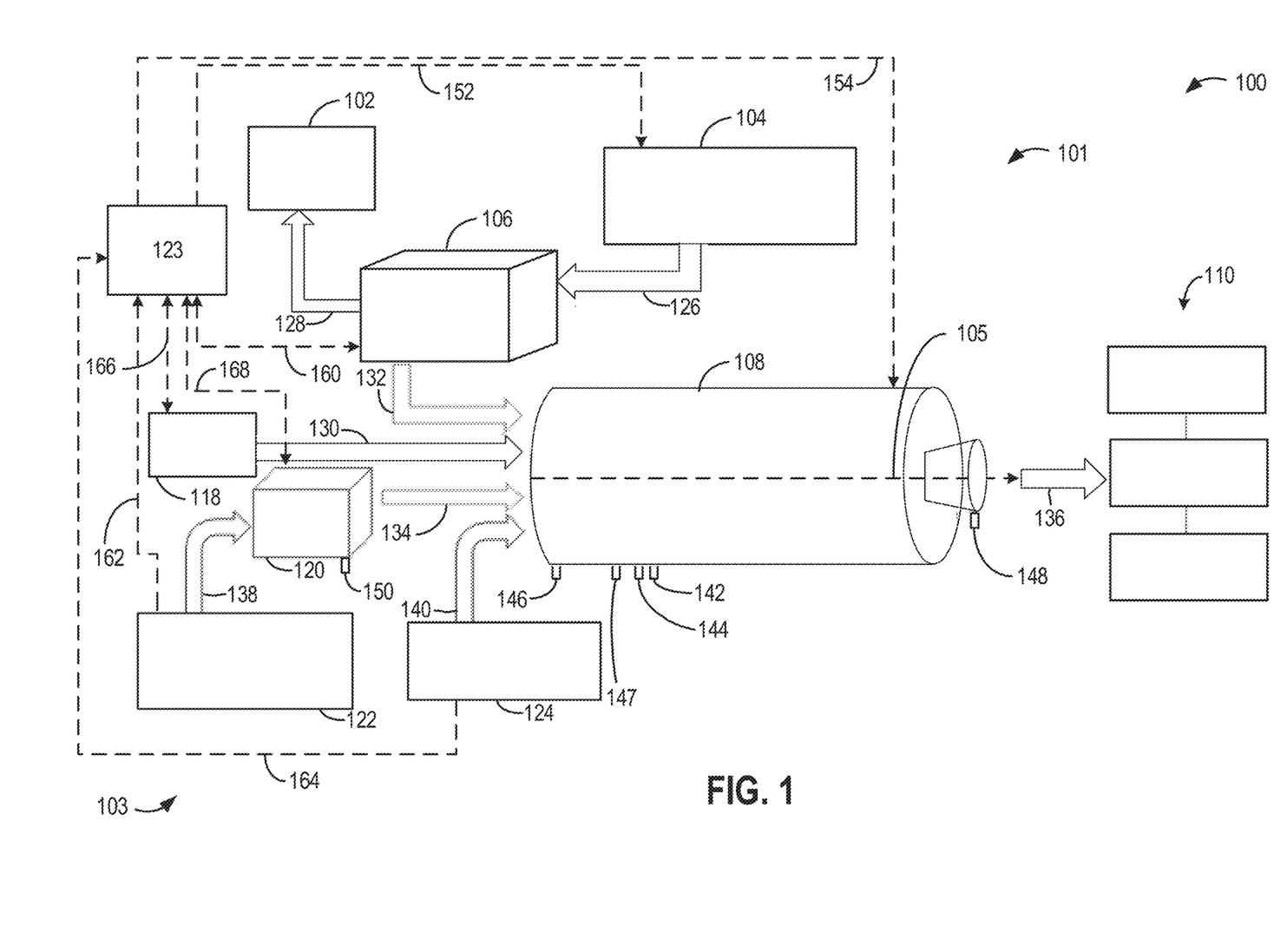
FIG. 1 shows a first schematic diagram of a thermomechanochemical (TMC) waste treatment system, including subsystems for various forms of waste.
Figure 2:
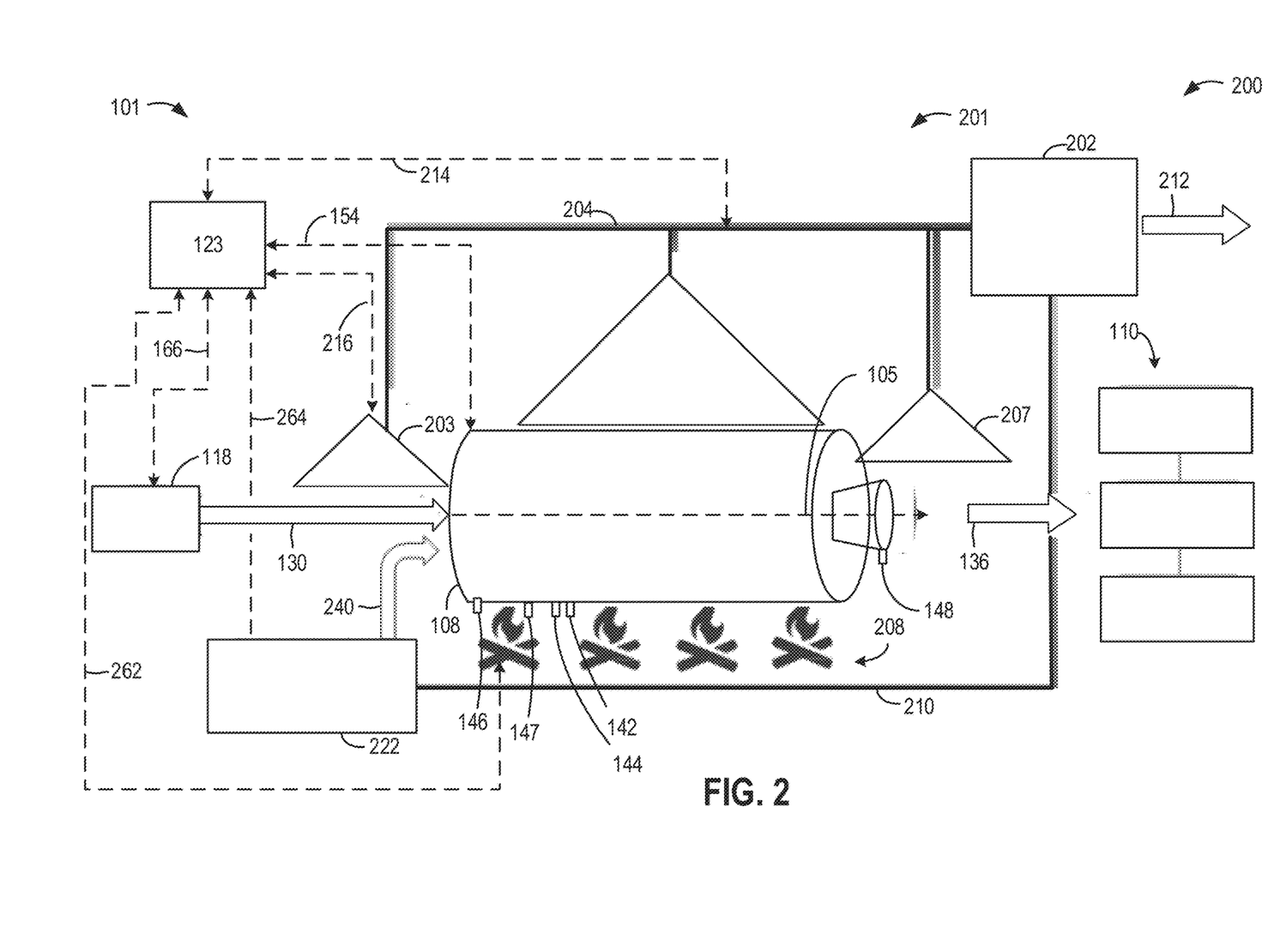
FIG. 2 shows a second schematic diagram of a TMC waste treatment system, including subsystems for removal of byproduct after treatment.

FIGS. 1 and 2 depict a first embodiment 100 and a second embodiment 200 of a thermomechanochemical (TMC) waste treatment system 101 for processing waste material. The first embodiment 100 includes a first set of components of the waste pre-processing subsystem 103, a TMC chamber 108, and a first set of components of a waste disposal subsystem 110. The second embodiment 200 includes a second set of components of the waste pre-processing subsystem 103, the TMC chamber 108, and a second set of components of a waste disposal subsystem 110 including an emission control system 201, a heating system 208. Both of the first embodiment 100 and the second embodiment 200 also include a controller 123. The first and the second embodiments are shown as example embodiments of the TMC waste treatment system 101 having a plurality of common components. Alternate embodiments of the TMC waste treatment system 101 may be constructed to include one or more components introduced in the first and the second embodiments.

Referring now to FIG. 1, the first embodiment 100 of the TMC waste treatment system 101 for waste processing includes the waste pre-processing subsystem 103. The waste pre-processing subsystem 103 (including the first set of components) may be configured to process a plurality of waste feedstocks coming from a plurality of containers, in preparation for TMC treatment within the TMC chamber 108. The waste pre-processing subsystem 103 may include a first feedstock 104 of waste in the liquid-solid state, the first feedstock 104 delivered to the TMC chamber 108 via a liquid-solid separation unit 106, as indicated by arrow 126. Within the liquid-solid separation unit 106, the first feedstock 104 of liquid-solid waste, e.g. Aqueous Film Forming Foam (AFFF) used for fighting high-hazard flammable liquid fires, may be partitioned into a liquid waste component, and a semi-liquid, slurry, or wet solid (SSS) waste component. The liquid component of the waste treated in the liquid-solid separation unit 106 may be transferred to a liquid containment unit 102, as indicated by arrow 128, and the SSS waste component may be transferred to the TMC chamber 108, as indicated by arrow 132. The liquid partitioned in the liquid containment unit 102 may be separately processed such as by dewatering, sedimentation, composting, incineration, solidification, etc.

Waste pre-processing subsystem 103 may also include a second feedstock 122 of semi-wet or slurry solid (SSS) waste, the second feedstock 122 delivered to the TMC chamber 108 via a dryer 120. For example, second feedstock 122 may include sludge generated from sewage processing, and/or biosolids, etc. The second feedstock 122 may be optionally fed into dryer 120, as indicated by arrow 138, to dry the SSS waste to below a threshold level of moisture contained therein, as determined by a humidity sensor 150 of the dryer 120. The threshold moisture level may be pre-calibrated threshold based on the kind of waste material present in the second feedstock. Waste from the second feedstock 122 that has been dried in the dryer 120 may then be fed into the TMC chamber 108, as indicated by arrow 134.

Further included in the waste pre-processing subsystem 103 is a third feedstock 124 of dry solid waste, which includes waste determined to be sufficiently dry, e.g. containing a level of liquid content below the threshold moisture level. The third feedstock 124 may be sent directly into the TMC chamber 108, as indicated by arrow 140.

In conjunction with the aforementioned subsystems of the waste pre-processing subsystem 103, a dry or wet PFAS solid waste feedstock 222 may be included in the TMC preprocessing subsystem, as shown by arrow 240 in FIG. 2. The dry or wet PFAS solid waste feedstock 222 may include for example spent Granulated Activated Carbon (GAC) filters used during a previous TMC processing cycle.

In conjunction with the waste pre-processing subsystem 103, a processing reagent subsystem 118 may be included within the TMC waste treatment system 101 coupled to the TMC chamber 108, as indicated by arrow 130. The processing reagent subsystem 118 may add specialized co-milling materials (e.g. reagents) to the waste feedstocks 104, 122, 124, and 222 fed into the TMC chamber 108, based on properties of the waste feedstocks determined via information received about the waste feedstocks via a plurality of sensors contained within the waste pre-processing subsystem 103. For example, humidity sensors, mass sensors, and PFAS sensors (not shown) may be included within the waste pre-processing subsystem 103 to determine the mass, moisture content, and PFAS concentrations included within the pre-processed waste feedstocks. In response to mass, moisture content, and PFAS concentration data, the processing reagent subsystem 118 may add one or more of a type of specialized reagent (e.g. calcium hydroxide ($Ca(OH)_2$)) at a given feed rate to the waste feedstocks 104, 122, 124, and 222. Sensors (not shown) for monitoring processing reagent, such as mass sensors and chemical sensors, to determine correct amount of processing reagents may be included within processing reagent subsystem 118.

TMC waste treatment system 101 may also include the TMC chamber 108. TMC chamber 108 may be a chamber designed to be rotated about a central axis 105 during processing of one or more of the waste feedstocks 104, 122, 124, and 222, in order to provide mixing of one or more of the waste feedstocks 104, 122, 124, and 222 contained therein. In one example, the TMC chamber 108 may be a cylindrically-shaped vessel made out of made of steel, with dimensions of 3 ft. in diameter by 7 ft. in length; however other chamber shapes, sizes, and materials may be used. For example, TMC chamber 108 may include a milling system which may weigh in a range of 70,000-80,000 pounds. The milling system may be operable in a temperature range, for example of 200-650° F. with a nominal heat capacity of 0.111 Btu/lb-° F. (based on stainless steel), a potential rate of heat loss of 15%/hour, and an example efficiency of 80% of PFAS destruction when operational. Included within the milling system of the TMC chamber 108 are deaggregators, including mobile objects such as milling balls, or stationary impact devices such as blocks and blades attached to the inner wall of the TMC chamber 108. The TMC chamber may include one or more types of the deaggregators mentioned above. The deaggregators break up the waste material within the TMC chamber upon the waste material coming in contact with the deaggregators. Mixing of the pre-processed waste with deaggregators and co-milling materials added from the processing reagent subsystem 118 may deagglomerate the waste material contained within the TMC chamber 108 to increase surface area exposure of the waste materials and the co-milling materials, thereby inducing thermal evolution (cleaning) of pollutants, and/or mechano-chemical destruction of pollutants. As an example, the addition of the co-milling materials in conjunction with milling may act to generate radicals from co-milling materials and localized high temperatures that may mineralize PFAS.

Referring now to FIG. 2, in addition to the inclusion of co-milling materials to the TMC chamber 108 via processing reagent subsystem 118 during TMC treatment, the TMC chamber may also be coupled to a heating system 208. The TMC chamber 108 may be rotated around the central axis 105 during heating via the heating system 208. A heating cycle of the TMC chamber 108, via heating system 208, may be activated in response to data obtained via a plurality of sensors indicating the mass, composition, moisture content, and pressure contained within the TMC chamber 108. For example, the temperature of the heating system 208 may be set at an initial operating temperature of 400° F., but may be adaptively updated based on the mass, moisture content, temperature, and pressure of the materials contained within the TMC chamber 108, combined with information from material sensors 146 and 148 included at the input and at the output of the chamber, monitoring waste material entering the chamber and the liberated vapor.

Sensors are included at the TMC chamber 108, which may send data to controller 123, which may then actuate the TMC chamber 108, the milling system included in the TMC chamber, and the heating system 208 in response to such data; such communication is depicted by dashed lines 154 and 262, respectively. In particular, the TMC chamber 108 may include a pressure sensor 142, a temperature sensor 144, and a humidity sensor 147. The pressure sensor 142, temperature sensor 144, and the humidity sensor 147 may send signals to a controller 123 of pressure inside the TMC chamber 108, temperature inside the TMC chamber, and humidity of the waste material, respectively. In response to the signals received by the controller from each of the sensors 142, 144, 147, the controller 123 may adjust process parameters of the TMC process. For example, if the pressure in the TMC chamber 108 is above a threshold level, the controller 123 may adjust the pressure of a negative pressure module in order to remove gaseous byproducts of TMC processing from the chamber more quickly, and may additionally lower the temperature of heating system 208 in order to reduce the rate of volatilization of gases off of waste within the chamber.

The TMC chamber 108 may include a plurality of material sensors such as a first material sensor 146 coupled at an inlet of the TMC chamber 108 and a second material sensor 148 coupled at an outlet of the TMC chamber 108. In addition, other material sensors may be coupled to different regions between the inlet and the outlet of the TMC chamber 108. The material sensors may include a liquid sensor configured to determine a proportion of liquid in the waste material entering and leaving the TMC chamber. The material sensors may include a gas sensor configured to determine kind and concentration of gases (such as PFOA) entering and leaving the TMC chamber 108. The material sensors may also include solid sensors such as configured to determine fluoride levels in the material stream. The material sensors may comprise of one or more of conductivity sensors, acoustic sensors, and spectrometers such as Fourier transform infrared (FTIR) spectroscope to determine the properties of gases and liquids flowing in and out of the TMC chamber 108.

During operation of the TMC chamber, process parameters including real-time measurement of speciated concentrations of liberated gases containing PFAS and other compounds may be monitored via the materials sensors 146, 148 to ascertain input contamination levels and pollution removal/destruction efficacy, for automated system process optimization. The first material sensor 146 may determine that the input pollutant load in the waste material stream entering the TMC chamber 108, and the second material sensor 148 may determine that the input pollutant load at the end of treatment within the TMC chamber 108. Based on the change in pollutant load upon processing at the TMC chamber 108 the process conditions (e.g. residence time in TMC chamber and temperature) may be adjusted in real time to ensure treatment efficacy. The real-time measurement of speciated concentrations of liberated gases containing PFAS and other compounds ascertain input contamination levels and pollution removal/destruction efficacy, for automated system process optimization. The first material sensor 146 may determine characteristics such as the size distribution of the waste material, a chemical composition of the waste material, and an amount of moisture in the waste material entering the TMC chamber, and based on the characteristics of the waste material, an initial set of process parameters of the TMC chamber (such as temperature of TMC chamber, dwell time in chamber, speed of rotation of chamber, and amount of reagents added during milling) may be determined.

The initial determination and adjustments to process conditions may be based on a look-up table including optimal processing conditions corresponding to different threshold loads of pollutants entering and leaving the TMC chamber 108. Further, the adjustments to process conditions may be based on a learning algorithm and/or a feedback mechanism.

In one example, data obtained via the materials sensors 146, 148 may suggest that gases liberated during TMC treatment, which contain PFAS, may include an amount of PFAS above a threshold level, and in response, the process parameters including a temperature of operation of the TMC chamber and the duration of milling of the waste materials may be increased for further breakdown of the PFAS.

In another example, data obtained via the materials sensors 146, 148 may suggest that the initially contaminated biosolid material was reduced in pollutant level to below an acceptable threshold, and the biosolid material output from the TMC chamber 108 may be safely land-applied for beneficial reuse as per application federal, state, and or local regulation. Confirmation of suitability for land application varies per local, state, tribal, or federal regulations, but typically involves measurement of nutrient levels in the material and assurance that adverse chemicals will not leach at unacceptable levels.

TMC waste treatment system 101 may also include an emission control system 201. The emission control system may include a vacuum system 206 including a first negative pressure module 203, a second negative pressure module 205, and a third negative pressure module 207, with each of the negative pressure modules 203, 205, 207 fluidly coupled to a vent line 204. The vent line 204 may be configured to flow gaseous byproducts obtained via each of the negative pressure modules 203, 205, 207 to an emissions control module 202, the emissions control module 202 configured to remove gaseous byproducts during TMC processing. The first negative pressure module 203 may provide a vacuum to flow vapors coming off of waste material from waste feedstocks 104, 122, 124, 222 during pre-processing of the PFAS contaminated waste. The second negative pressure module 205 may be fluidly coupled to the interior of the TMC chamber 108, and may provide vacuum to the interior of the TMC chamber 108 in order to flow vapors coming off of the waste being processed therein. The third negative pressure module 207 may provide a vacuum to flow vapors coming off of byproduct after treatment 136.

Gaseous byproducts flowed from each of the negative pressure modules 203, 205, 207 may then flow via vent line 204 to the emissions control module 202. The emissions control module 202 may include one or more of a granulated activated carbon (GAC) filter, a catalyst, and a thermal oxidizer (TO), or other control device. Based on the level of pollutants in the byproducts being treated at the emissions control module 202, the material output from the emissions control module may be fed back to the TMC chamber 108 for one or more processing cycles, until the level of pollutants reduce to below a threshold level of contamination, such that a byproduct after treatment 136 output from the TMC chamber may be disposed of or reused. At the emissions control module 202, the PFAS and other toxins from the gaseous byproducts are filtered out or destroyed. For example, high volumes of gaseous byproducts that are volatile and combustible may be routed to the TO where they may be combusted, with the byproduct of the combustion released to atmosphere (as indicated by arrow 212) or recycled back to the emissions control module 202.

Following TMC processing of the waste material in the TMC chamber 108, the byproduct after treatment 136 may be sorted, stored and/or disposed of via waste disposal subsystem 110, as depicted in FIGS. 1, 2. Waste disposal subsystem 110 may be configured to receive solid and semi-solid byproducts after treatment of the waste material at the TMC chamber 108 and recycle at least a portion of the solid and semi-solid byproducts. Waste disposal subsystem 110 may include a plurality of disposal units, with each unit of the plurality of disposal units configured to store byproduct after treatment based on the properties of the byproduct after treatment. For example, byproduct after treatment that is determined to be non-reusable may be stored in a first unit for disposal, while byproduct after treatment that is determined to be reusable (e.g. processed biosolid waste with a below threshold level of PFAS) may be stored in a second unit for later reuse. As an example, the reusable output may be recycled back to soil from the second unit.

TMC waste treatment system 101 may also include controller 123, as depicted in FIGS. 1, 2. Controller 123 may be powered through onboard stored energy via a battery (not shown). Controller 123 may be configured as a conventional microcomputer including a microprocessor unit, input/output ports, read-only memory, random access memory, keep alive memory, a controller area network (CAN) bus, etc. The controller 123 may include a controller configured to receive input data from the various sensors, process the input data, and trigger the actuators in response to the processed input data based on instruction or code programmed therein corresponding to one or more routines. For example, data of the moisture content of each of the waste feedstocks 104, 122, 124, and 222, may be communicated to the controller via respective humidity sensors (not shown), with the communication between the waste feedstocks 104, 122, 124, 222 and the controller 123 depicted here by dashed lines 152, 162, 164, and 264, respectively, in order to determine further pre-processing via the waste pre-processing subsystem 103. Controller 123 may also communicate with the liquid-solid separation unit 106 (as indicated by dashed line 160) via a humidity sensor (not shown). The humidity sensor of the liquid-solid separation unit 106 may be used in order to determine if the moisture level of the separated solid waste of the liquid-solid separation unit is below a threshold level in order to send first feedstock 104 into the TMC chamber 108. Additionally, the humidity sensor 150 may be included on dryer 120. Data received from the humidity sensor 150 may be utilized by controller 123 to adaptively set the duration and heating level to be set for dryer 120, the communication between the controller 123 and the dryer 120 indicated by dashed line 168.

The processing reagent subsystem 118 may also send sensor data to controller 123 and may be actuated via controller 123 to feed co-milling material into the TMC chamber 108, as indicated by dashed line 166. The processing reagent subsystem 118 may include a mass sensor and a belt feed sensor, in order to supply an appropriate amount of co-milling material to TMC chamber 108 in response to signals received by the controller 123. For example, the feed rate of the co-milling material may depend on the mass of the waste contained within the TMC chamber 108, which may decrease as TMC processing continues, as gaseous byproducts are emitted into the emission control system 201.

The emission control system 201 may contain one or more sensors determining the chemical composition of gaseous byproducts flowed into the vent line 204 via the negative pressure modules 203, 205, 207, the one or more sensors (not shown) sending data of the chemical composition (real-time monitoring) of the gaseous byproducts to the controller 123, which may then actuate the pressure modules to generate more or less vacuum depending on said data. The communication between the emission control system 201 and the controller is depicted by dashed line 214. For example, the sensors may include a PFAS sensor to determine a concentration of PFAS within the gaseous byproducts flowed into the emission control system 201. Sensors may also include a mass air flow (MAF) sensor, such that the controller 123 may adjust TMC process parameters, (e.g., feed rate of processing reagent, temperature of heating system 208, rotation rate of TMC chamber 108) based on the amount gaseous byproducts generated. Sensors may also be included for other contaminants, and the controller 123 may adjust TMC processing parameters based on data received by controller 123 of the amount of contamination of the gaseous byproducts. An example of an added contaminant sensor is an online-Fourier transform infrared spectroscopy unit. Another example of an added contaminant sensor is a laser-ablation fluorine detector.

Figure 3A:
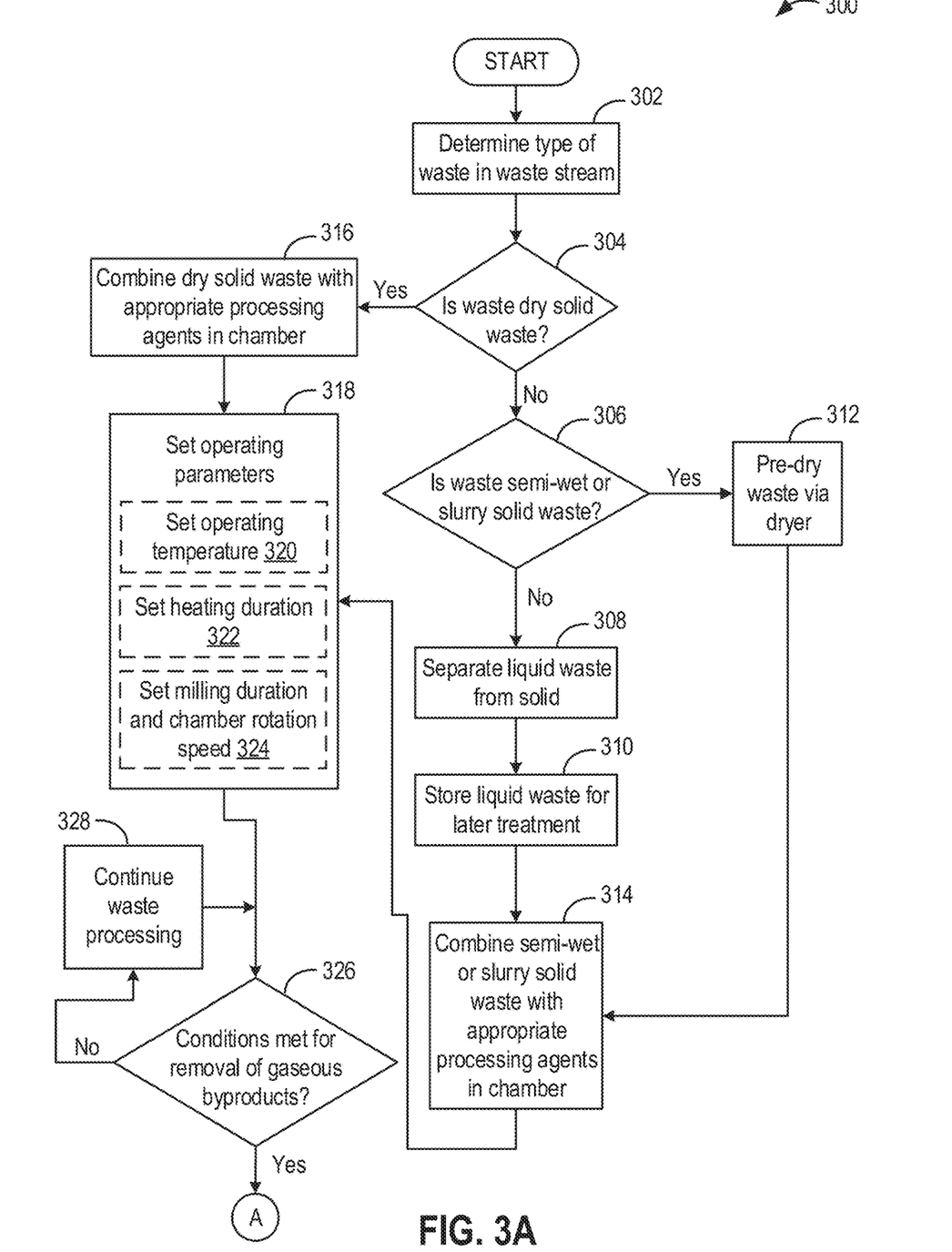
FIGS. 3A, 3B show a flow chart of a method for operating a TMC waste treatment system, such as the TMC waste management system of FIGS. 1, 2.
Figure 3B:
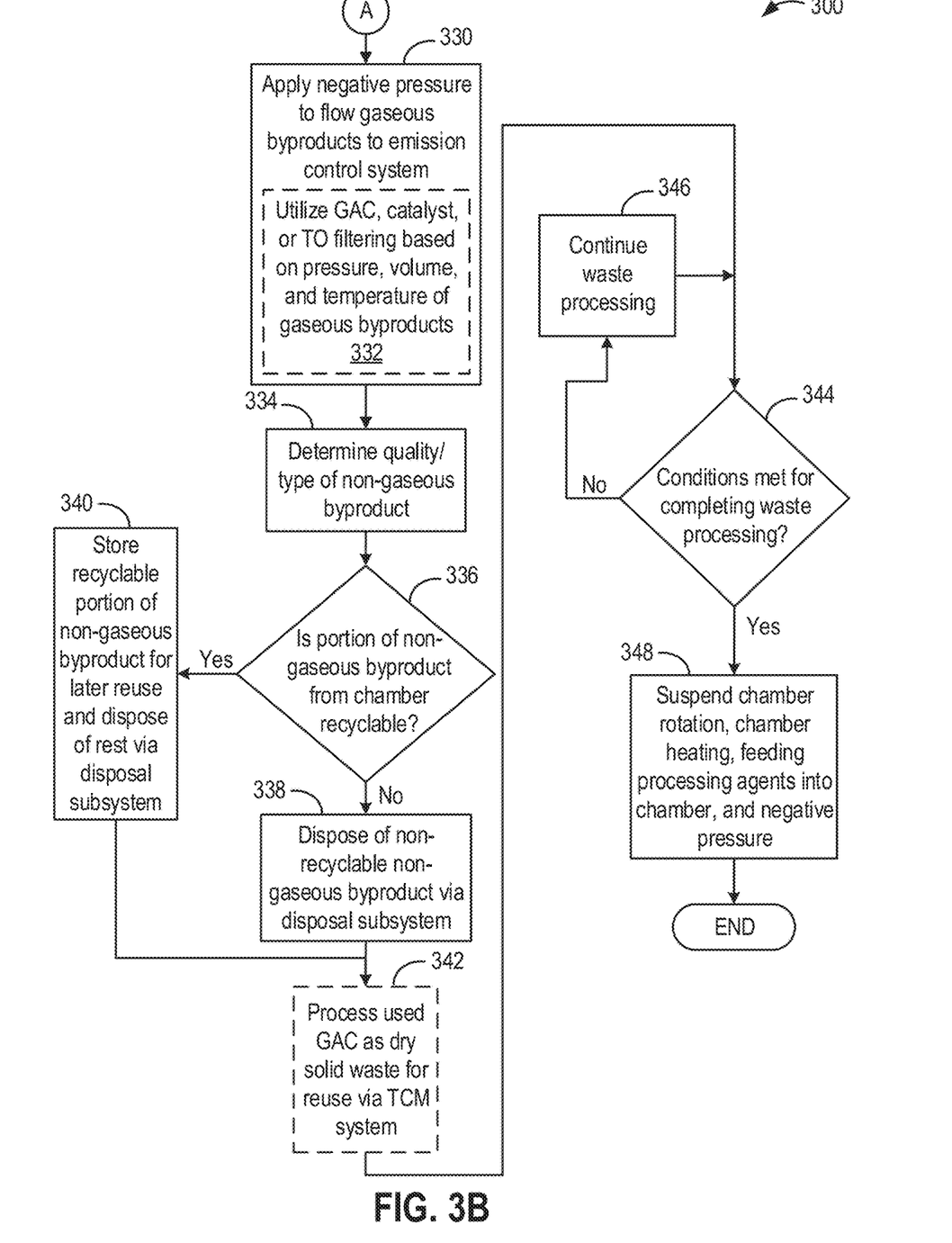

FIGS. 3A, 3B illustrate a method 300 for operating a thermomechanochemical (TMC) system (such as TMC waste treatment system 101 of FIGS. 1, 2) for processing PFAS-contaminated waste. Method 300 and all other methods described herein will be described in reference to the systems described herein and with regard to FIGS. 1, 2 but it should be understood that similar methods may be applied to other systems without departing from the scope of this disclosure. Method 300 may be carried out by controller 123, and may be stored in non-transitory memory. Instructions for carrying out method 300 may be executed by the controller in conjunction with signals received from the TMC via a plurality of sensors included therein.

At 302, method 300 includes determining details of waste properties to be processed by the TMC system. Broad waste categories will be known to operators based on waste manifest from generators. The broad categories of waste may be one of a liquid-solid waste, dry solid waste, or semi-wet or slurry solid waste. As an example, the type of incoming waste may be determined based on moisture content of the waste, initially estimated by waste producer and confirmed via a humidity sensor. For example, liquid-solid waste may have a moisture content of >30%, semi-wet or slurry solid waste may have a moisture content of 10%-30%, and dry waste may have a moisture content of <1%-<10%.

At 304, method 300 may include determining if the incoming waste is dry solid waste. If the waste is not determined to be dry solid waste, method 300 may proceed to 306.

At 306, method 300 may include determining if the incoming waste is semi-wet or slurry solid (SSS) waste. If the waste is not determined to be SSS waste, the waste may then be inferred to be liquid-solid waste feedstock (such as first feedstock 104 of FIG. 1), and method 300 may proceed to 308 to separate liquid waste from solid waste in the liquid-solid waste. The liquid solid waste may be transferred (as indicated by arrow 126 of FIG. 1) to a liquid-solid separation unit (such as liquid-solid separation unit 106 of FIG. 1). As an example, solid waste may be partitioned from liquid waste within the liquid-solid separation unit via one or more of clarification (e.g., gravity sedimentation), centrifugal separation, delayed cake filtration, belt filters, vacuum dryers, etc. Following separation of the liquid waste from the solid waste within the liquid-solid separation unit, at 310, the partitioned liquid waste within the liquid-solid separation unit may be transferred (as indicated by arrow 128 of FIG. 1) to a liquid containment unit (such as liquid containment unit 102 of FIG. 1) for later processing. The remaining waste may then be SSS waste, to be added to a TMC chamber (such as TMC chamber 108 of FIG. 1), as indicated by arrow 132 of FIG. 1. At 314, the SSS waste may be combined with appropriate processing reagents via a processing reagent subsystem (such as processing reagent subsystem 118 of FIGS. 1, 2) in the TMC chamber. For example, the processing reagents may include silica ($SiO_2$), potassium hydroxide (KOH), calcium oxide (CaO), and/or calcium hydroxide ($Ca(OH)_2$). The processing reagents, and the feed rate may be determined based on the mass of the waste feedstock, and the chemical properties of the waste feedstock, as determined by a material properties sensor (such as first material sensor 146 of FIGS. 1, 2). Following 314, method 300 may then proceed to 318.

At 306, if it is determined that the incoming waste is SSS waste, then method 300 may proceed to 312 to pre-dry the SSS waste via a dryer (such as dryer 120 of FIG. 1). The dryer may operate at a temperature of 600° F., for example. Drying of the SSS waste via the dryer may dry the SSS waste until it is below a threshold level of moisture, as determined by a humidity sensor (such as humidity sensor 150 of FIG. 1). The threshold level of moisture may be a level of moisture below which the SSS waste may be considered to be dry solid waste. For example, the threshold level of moisture for the SSS waste to be inputted into the TMC chamber may be 10-20%. Following drying of the SSS waste via the dryer, method 300 may then proceed to 314 to combine semi-wet or slurry solid waste with appropriate processing reagents in the TMC chamber. The appropriate processing reagents, and the feed rate may be determined based on the mass of the waste feedstock, and the chemical properties of the waste feedstock, as determined by the first material properties sensor. Following 314, method 300 may then proceed to 318.

Returning to 304, if it is determined that the incoming waste is dry solid waste (such as third feedstock 124 of FIG. 1), method 300 may then proceed to 316 to combine the dry solid waste with appropriate processing reagents in the TMC chamber. The appropriate processing reagents, and the feed rate may be determined based on the mass of the waste feedstock, and the chemical properties of the waste feedstock, as determined by the first material properties sensor. Following 316, method 300 may then proceed to 318.

At 318, method 300 may include setting the process parameters of TMC treatment of waste material transferred to the TMC chamber. The process parameters may depend on the type of waste feedstock (e.g. dry solid waste, as from 316 or SSS waste, as from 314). The process parameters of the TMC processing include, at 320, setting the operating temperature of a heater (such as heating system 208 of FIG. 2). The operating temperature of the heater may depend on the type of waste material and the processing reagents added. For example, for SSS waste, the operating temperature may be in a range of 160° F. to 400° F., while for dry solid waste, the operating temperature may be in a range of 160° F. to 650° F. During heating, the operating temperature may be adaptively adjusted based on temperature, pressure, and volume of gaseous byproduct generated in response to TMC treatment of waste, as determined by temperature, pressure, and materials sensors, respectively (such as temperature sensor 144, pressure sensor 142, and materials sensors 146, 148 of FIGS. 1, 2). Adaptation of the operating temperature may, in one example, be utilized in order to maintain energy efficiency of the TMC process. In another example, adaptation of the operating temperature may be utilized in order to reduce pressure within the TMC chamber during operation to below a threshold level of pressure In yet another example, adaptation of the operating temperature may be utilized in order to make sure that the temperature of the waste material being processed in the TMC chamber is below a threshold temperature, beyond which recyclability of the output waste byproduct is possible.

The process parameters of the TMC processing include, at 322, setting the heating duration. The heating duration of the heater may depend on the type of waste material and the processing reagents added. For example, for SSS waste, the operating heating duration may be in a range of 6 hours, while for dry solid waste, the heating duration may be in a range of 3 hours. During heating, a projected heating duration may be adaptively adjusted based on temperature, pressure, and volume of gaseous byproduct generated in response to TMC treatment of waste, as determined by temperature, pressure, and materials sensors. For example, adaptation of the heating duration may be utilized in order to maintain energy efficiency of the TMC process.

The process parameters of the TMC processing include, at 324, setting the milling duration (such as using ball milling or any other form of deaggregator) and speed of rotation of the TMC chamber. The milling duration may depend on the type of waste material and the processing reagents added. For example, for SSS waste, the operating milling duration may be in a range of 5 minutes to 2 hours, while for dry solid waste, the milling duration may be in a range of 20 minutes to 2 hours. The speed of rotation of the TMC chamber may similarly depend on the type of waste material and the processing reagents added. For example, for SSS waste, the operating rotation speed of the TMC chamber may be in a range of 10 revolutions per minute, while for dry solid waste, the operating rotation speed of the TMC chamber may be in a range of 30 revolutions per minute. During the milling process, a projected milling duration may be adaptively adjusted based on temperature, pressure, and volume of gaseous byproduct generated in response to TMC treatment of waste, as determined by temperature, pressure, and materials sensors, respectively. Similarly, the rotation speed of the TMC chamber may be adapted based on similar data, for example in order to maintain energy efficiency of the TMC processing.

At 326, method 300 may include determining if conditions are met for removal of gaseous byproducts from the TMC chamber. For example, if the pressure within the TMC chamber is above a threshold level, then a second negative pressure module (such as second negative pressure module 205 of FIG. 2) of an emission control system (such as emission control system 201 of FIG. 2) may be switched on in order to flow gaseous byproducts of the TMC treatment out of the chamber. If conditions are not met for removal of gaseous byproducts, method 300 may proceed to 328 to continue processing, and then may return to 336. Otherwise, method 300 may proceed to 330.

At 330, method 300 includes applying a negative pressure to flow gaseous byproducts to emission control system. Applying negative pressure includes switching on each of a negative pressure control module (such as negative pressure modules 203, 205, 207 of FIG. 2) in order to remove gaseous byproducts during TMC treatment of waste in the TMC chamber. The gaseous byproducts routed to each of the first negative pressure module, the second negative pressure module, and the third negative pressure module may then enter a vent line (such as vent line 204 of FIG. 2), after which it may be sent to an emissions control module (such as emissions control module 202 of FIG. 2). As described in relation to FIG. 2, the negative pressure modules may intake gaseous byproducts during each stage of the waste treatment (waste material, waste undergoing TMC treatment, and byproduct after treatment). In particular, the first negative pressure module may provide a vacuum to flow vapors coming off of waste material from waste feedstocks (such as waste feedstocks 104, 122, 124, 222 of FIGS. 1, 2) during pre-processing of the PFAS-contaminated waste. The second negative pressure module may be fluidly coupled to the interior of the TMC chamber, and may provide vacuum to the interior of the TMC chamber in order to flow vapors coming off of the waste being processed therein. The third negative pressure module may provide a vacuum to flow vapors coming off of a byproduct after treatment (such as byproduct after treatment 136 of FIGS. 1, 2) after TMC processing.

At 332, method 300 may include utilizing pollution control technologies, such as granulated activated carbon (GAC), a catalyst, or thermal oxidizer (TO), via an emissions control module (such as emissions control module 202 of FIG. 2) based on the pressure, volume, and temperature of gaseous byproducts produced during the treatment process. For example, if the volume of flammable gaseous byproducts produced per unit time (as determined by the MAF sensor) during the treatment process are above a threshold flow rate, then the high volumes of gaseous byproducts may be treated via thermal oxidation, whereby the gaseous byproducts may be combusted.

The choice of using a specific pollution control technology may also depend on the temperature of the gaseous byproducts. For example, if the temperature of the gaseous byproducts is above a threshold temperature, the GAC may not be used and a catalyst may be more appropriate. The choice of using GAC, a catalyst, or TO may also depend on the level of contamination in the gaseous byproducts, in addition to the level of contamination of the GAC and catalysts. For example, if the GAC is already loaded above a first threshold level (as determined by e.g. a pressure sensor attached to the GAC), and the catalyst is loaded above a second threshold level (as determined by e.g. a pressure sensor attached to the catalyst), then use of the TO may be more appropriate, in order to treat the gaseous byproducts. Similarly, if the amount of contaminants in the gaseous byproducts is above a threshold level of contamination as determined by a PFAS sensor and other contaminant sensors of the emission control system, the TO may be used. Otherwise, if the levels of loading of the GAC and/or catalyst are below their respective threshold levels, the temperature of the gaseous byproducts is within the acceptable temperature range for usage for either of the GAC and/or catalyst, and the level of contamination of the gaseous byproducts is below a threshold level, either of the GAC or the catalyst may be used to filter the gaseous byproduct.

At 334, method 300 may include determining the quality/type of non-gaseous byproduct generated from the TMC processing (e.g. the byproduct after treatment). The quality/type of byproduct after treatment may be determined by a second material sensor (such as second material sensor 148 of FIGS. 1, 2) coupled to an output of the TMC chamber. For example, the output sensor may determine the amount of contaminants retained within the byproduct after treatment, such as a percentage of PFAS contaminant in the byproduct after treatment, among other contaminants.

At 336, method 300 may include determining if a portion of the non-gaseous byproduct (e.g. the byproduct after treatment) is recyclable. Determining if a portion of the byproduct after treatment may include utilizing the measure of contaminants from 324 to determine if a portion of the byproduct after treatment is below a threshold level of contamination. If it is determined that the byproduct after treatment is not recyclable, then method 300 may proceed to 338, which includes disposing of the non-recyclable non-gaseous byproduct via a disposal subsystem (such as waste disposal subsystem 110 of FIGS. 1, 2). Following 338, method 300 may then optionally proceed to 342. However, if it is determined that a portion of the waste material is recyclable, then method 300 may proceed to 340 to store the recyclable portion of the non-gaseous byproduct for later reuse, and may dispose of the rest of the non-gaseous byproduct via the disposal subsystem. In one example, the recyclable portion may be released such as added back to soil. Following 340, method 300 may then optionally proceed to 342.

At 342, method 300 may include processing the used GAC filter as dry solid waste for reuse via the TMC system. Processing the GAC filter may proceed if the level of loading of the GAC filter is above the first threshold level of loading as determined in 332. If the level of loading of the GAC filter is above the first threshold level of loading, the GAC may be circulated via a GAC return line (such as GAC return line 210 of FIG. 2) as dry solid waste to be added to the TMC chamber. TMC processing of the GAC filter may then follow from 316 of method 300.

At 344, method 300 includes determining if conditions are met for completing the TMC waste processing. Conditions for completing TMC waste processing may include the contents of the gaseous byproducts being below a level of contamination as determined by one or more contamination sensors of the emission control system, a flow rate of gaseous byproducts being below a threshold flow rate of the emission control system, a feed rate of the waste feedstocks being 0, the rate of mass of waste material outputted by the TMC chamber being below a threshold level, and the level of contamination of the byproduct after treatment being below a threshold level as determined by the second material sensor of the TMC chamber. If the conditions for completing TMC waste processing are not met, method 300 may proceed to 346 to continue TMC waste processing. If the conditions for completing TMC waste processing are met, then method 300 may proceed to 348 to suspend rotation of the TMC chamber, heating of the chamber via the heater, negative pressure application via the negative pressure modules of the emission control system, and the feeding of processing reagents (co-milling materials) to the chamber. Following 348, method 300 may end.

In this way, a thermomechanochemical (TMC) waste system may be operated for processing PFAS-contaminated waste. Waste material may be fed to the TMC chamber from one or more containers housing waste material being in a liquid-solid state, a semi-wet or slurry solid (SSS) state, and/or a dry solid state. The waste material may be processed at the TMC chamber by milling at elevated temperatures in a presence of co-milling reagents, and byproducts obtained after processing of the waste material at the TMC chamber may be removed via the disposal system and/or the emissions control module. The co-milling reagents may be added to the TMC chamber from the processing reagent subsystem, the co-milling reagents chemically reacting with the waste material during milling of the waste material via deaggregators included within the TMC chamber.

By combining thermal processing with mechano-chemical processing as part of treating PFAS-contaminated waste feedstocks, multiple types of waste feedstocks may be treated by a single thermomechanochemical (TMC) system. By utilizing mechano-chemical treatment in conjunction with thermal treatment of PFAS contaminated waste, lower temperatures may be used during TMC treatment as compared with a solely thermal treatment, allowing a greater portion of the byproduct after treatment to be recyclable. Additionally, by utilizing one or more of a catalyst, granulated activated carbon (GAC) filter, and a thermal oxidizer (TO) as part of an emission control system, gaseous byproducts of TMC treatment, with volatilized PFAS and other contaminants, may be treated, reducing emissions of harmful contaminants into the atmosphere during treatment of PFAS contaminated waste. By adaptively controlling TMC process parameters (such as feed rate of co-milling materials, temperature and pressure of the TMC chamber, and amount of negative pressure applied via the negative pressure modules of the emission control system), TMC treatment may be optimized for energy efficiency, in addition to optimal reduction of PFAS and other contaminants in the waste feedstock. By allowing treatment of a spent GAC filter via the TMC system, reuse and/or proper disposal of a GAC filter may be achieved.

The disclosure provides support for a system for treatment of waste material, comprising: a thermomechanochemical (TMC) chamber including a milling system, a heating system coupled to the TMC chamber, the heating system configured to co-operate with the milling system to process the waste material, and plurality of containers coupled to the TMC chamber at a first end, the plurality of containers including the waste material in one or more of a liquid-solid state, a semi-wet or slurry solid state, and a dry solid state. In a first example of the system, the waste material includes per- and polyfluoroalkyl substances (PFAS) comprising perfluorooctanoic acid (PFOA) and perfluorooctane sulfonic acid (PFOS). In a second example of the system, optionally including the first example, the plurality of containers include one or more of a first feedstock of waste material in the liquid-solid state, a second feedstock of waste material in the semi-wet or slurry solid state, and a third feedstock of waste material in the dry solid state, the first feedstock delivered to the TMC chamber via a solid-liquid separator, the second feedstock delivered to the TMC chamber via a dryer, and the third feedstock delivered directly to the TMC chamber. In a third example of the system, optionally including one or both of the first and second examples, the system further comprises: a plurality of sensors including one or more of a temperature sensor, a pressure sensor, and material sensors coupled to the TMC chamber, and a humidity sensor coupled to the dryer, wherein the material sensors are coupled to an inlet and an outlet of the TMC chamber, the material sensors including one or more of a gas sensor, a liquid sensor, and a solid sensor. In a fourth example of the system, optionally including one or more or each of the first through third examples, the milling system in the TMC chamber is coupled to a processing reagent subsystem supplying co-milling reagents to the milling system, the milling system including deaggregators, the deaggregators including or more of milling balls, blocks, and blades. In a fifth example of the system, optionally including one or more or each of the first through fourth examples, the reagents are one or more of silica ($SiO_2$), potassium hydroxide (KOH), calcium oxide (CaO), and calcium hydroxide ($Ca(OH)_2$). In a sixth example of the system, optionally including one or more or each of the first through fifth examples, the TMC chamber is rotatable about its central axis during processing of the waste material. In a seventh example of the system, optionally including one or more or each of the first through sixth examples, the TMC chamber is coupled to an emissions control module via one or more negative pressure modules, the emissions control module including one or more of a granulated activated carbon (GAC) filter, a catalyst, and a thermal oxidizer (TO) configured to treat gaseous byproducts recovered from the TMC chamber. In an eighth example of the system, optionally including one or more or each of the first through seventh examples, the TMC chamber is coupled to a disposal system configured to receive solid and semi solid byproducts obtained after treatment of the waste material at the TMC chamber and recycle at least a portion of the solid and semi solid byproducts. In a ninth example of the system, optionally including one or more or each of the first through eighth examples, the one or more negative pressure modules include a first negative pressure module coupled to the plurality of containers including the waste material and configured to remove gaseous components of the waste material entering the TMC chamber, a second negative pressure module coupled to the TMC chamber and configured to remove the gaseous byproducts from the TMC chamber during processing of the waste material, and a third negative pressure module coupled to the disposal system and configured to remove the gaseous byproducts from the disposal system.

The disclosure also provides support for a method for a thermomechanochemical (TMC) waste treatment, comprising: feeding a waste material to a TMC chamber from one or more containers housing the waste material in one or more of a liquid-solid state, a semi-wet or slurry solid state, and a dry solid state, processing the waste material at the TMC chamber by milling at elevated temperatures in a presence of co-milling reagents, and removing byproducts obtained after processing of the waste material at the TMC chamber via one or both of a disposal system and an emissions control module. In a first example of the method, the feeding of the waste material in the liquid-solid state includes, separating the liquid-solid state into a solid component and a liquid component at a separator, and then feeding the solid component to the TMC chamber, and wherein the feeding of the waste material in the semi-wet or slurry solid state includes, drying the waste material in a dryer and the feeding of waste material in the dry solid state to the TMC chamber. In a second example of the method, optionally including the first example, the co-milling reagents are added to the TMC chamber from a processing reagent subsystem, the co-milling reagents chemically reacting with the waste material during milling of the waste material via deaggregators included within the TMC chamber. In a third example of the method, optionally including one or both of the first and second examples, the deaggregators include one or more of milling balls, blades, blocks, and other impact devices, and wherein the reagents include one or more of silica ($SiO_2$), potassium hydroxide (KOH), calcium oxide (CaO), and calcium hydroxide ($Ca(OH)_2$). In a fourth example of the method, optionally including one or more or each of the first through third examples, the method further comprises: adjusting process parameters including an amount of co-milling reagents added to the TMC chamber, a duration of milling, a temperature of the TMC chamber, and a duration of heating of the TMC chamber based on characteristics of the waste material, the characteristics including a size distribution of particles of the waste material, a chemical composition of the waste material, and an amount of moisture in the waste material. In a fifth example of the method, optionally including one or more or each of the first through fourth examples, removing the byproducts include routing gaseous byproducts from the TMC chamber to the emissions control module by application of negative pressure via one or more negative pressure modules, the emissions control module including one or more of granulated activated carbon (GAC) filter, a catalyst, and a thermal oxidizer (TO) filter, the method further comprising, based on a level of pollutants in an output product of the GAC filter, recycling the output product to the TMC chamber for one or more cycles of processing. In a sixth example of the method, optionally including one or more or each of the first through fifth examples, removing the byproducts via the disposal system includes separating a reusable portion of the byproducts for recirculation and disposing a remaining portion of the byproducts. In a seventh example of the method, optionally including one or more or each of the first through sixth examples, the method further comprises: monitoring real-time process conditions including a first level of pollutants in the waste material at an inlet of the TMC chamber and a second level of pollutants in the waste material at an outlet of the TMC chamber via material sensors coupled to the TMC chamber, and adjusting the process parameters based on the first level and the second level of pollutants. In an eighth example of the method, optionally including one or more or each of the first through seventh examples, monitoring the second level of pollutants includes real-time measurement of speciated concentrations of liberated gases containing PFAS and other compounds.

The disclosure also provides support for a thermomechanochemical (TMC) waste treatment system, comprising: a feeding system for waste material coupled to a TMC chamber, the TMC chamber including a plurality of milling balls or mechanisms, a heating system coupled to the TMC chamber, a processing reagent subsystem coupled to the TMC chamber, the processing reagent subsystem configured to deliver co-milling reagents to the TMC chamber, a disposal system coupled to the TMC chamber, the disposal system configured to remove gaseous and non-gaseous byproducts remaining after treatment of the waste material at the TMC chamber, and a real-time monitoring system including one or more material sensors enabling automated process optimization. In a first example of the system, the system further comprises: a controller including executable instructions stored in a non-transitory memory that cause the controller to: dry the waste material at the feeding system, feed the dried waste material to the TMC chamber from the feeding system, add a milling reagent to the TMC chamber, adjust process parameters including a temperature of the TMC chamber and a duration of milling based on characteristics of the waste material including a size distribution of particles of the waste material, a chemical composition of the waste material, and an amount of humidity in the waste material, wherein the automated process optimization includes further updating the process parameters based on output of the one or more material sensors coupled to an inlet and an outlet of the TMC chamber, and rotate the TMC chamber about is central axis while milling the waste material at the adjusted temperature, route a first gaseous portion of byproducts from the TMC chamber to an emissions control system by applying negative pressure at the TMC chamber and downstream of the TMC chamber, route a second portion of the byproducts to a recycling chamber for reuse, and route a third, remaining portion of the byproducts to a disposal system.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for treatment of waste material, comprising:
 a thermomechanochemical (TMC) chamber including a milling system;
 a heating system coupled to the TMC chamber, the heating system configured to co-operate with the milling system to process the waste material;
 a plurality of containers coupled to the TMC chamber at a first end of the TMC chamber, the plurality of containers including the waste material in one or more of a liquid-solid state, a semi-wet or slurry solid state, and a dry solid state; and
 a controller including instructions stored in a non-transitory memory that cause the controller to:
  set a temperature of the heating system in a range of 160° F. to 650° F. for a duration of 6 hours; and
  operate the milling system at a milling speed in a range of 10 revolutions per minute to 30 revolutions per minute.

2. The system of claim 1, wherein the waste material includes per- and polyfluoroalkyl substances (PFAS) comprising perfluorooctanoic acid (PFOA) and perfluorooctane sulfonic acid (PFOS).

3. The system of claim 1, wherein the plurality of containers include one or more of a first feedstock of waste material in the liquid-solid state, a second feedstock of waste material in the semi-wet or slurry solid state, and a third feedstock of waste material in the dry solid state, the first feedstock delivered to the TMC chamber via a solid-liquid separator, the second feedstock delivered to the TMC chamber via a dryer, and the third feedstock delivered directly to the TMC chamber.

4. The system of claim 3, further comprising a plurality of sensors including one or more of a temperature sensor, a pressure sensor, and material sensors coupled to the TMC chamber, and a humidity sensor coupled to the dryer, wherein the material sensors are coupled to an inlet and an outlet of the TMC chamber, the material sensors including one or more of a gas sensor, a liquid sensor, and a solid sensor.

5. The system of claim 1, wherein the milling system in the TMC chamber is coupled to a processing reagent subsystem supplying co-milling reagents to the milling system, the milling system including deaggregators, the deaggregators including one or more of milling balls, blocks, and blades.

6. The system of claim 5, wherein the co-milling reagents are one or more of silica ($SiO_2$), potassium hydroxide (KOH), calcium oxide (CaO), and calcium hydroxide (Ca($OH)_2$).

7. The system of claim 1, wherein the TMC chamber is coupled to an emissions control module via one or more negative pressure modules, the emissions control module including one or more of a granulated activated carbon (GAC) filter, a catalyst, and a thermal oxidizer (TO) configured to treat gaseous byproducts recovered from the TMC chamber.

8. The system of claim 7, further comprising a return line coupling the emissions control module to the TMC chamber configured to circulate the GAC filter to the TMC chamber as dry solid waste.

9. The system of claim 7, wherein the TMC chamber is coupled to a disposal system configured to receive solid and semi solid byproducts obtained after treatment of the waste material at the TMC chamber and recycle at least a portion of the solid and semi solid byproducts.

10. The system of claim 9, wherein the one or more negative pressure modules include a first negative pressure module coupled to the plurality of containers including the waste material and configured to remove gaseous components of the waste material entering the TMC chamber, a second negative pressure module coupled to the TMC chamber and configured to remove the gaseous byproducts from the TMC chamber during processing of the waste material, and a third negative pressure module coupled to the disposal system and configured to remove the gaseous byproducts from the disposal system.

11. A thermomechanochemical (TMC) waste treatment system, comprising:
 a feeding system coupled to a TMC chamber;
 the TMC chamber including a milling system, wherein the milling system includes a plurality of milling balls or mechanisms;
 a heating system coupled to the TMC chamber;
 a processing reagent subsystem coupled to the TMC chamber, the processing reagent subsystem configured to deliver co-milling reagents to the TMC chamber;
 a disposal system coupled to the TMC chamber, the disposal system configured to remove gaseous and non-gaseous byproducts remaining after treatment of waste material at the TMC chamber;
 a real-time monitoring system including one or more material sensors enabling automated process optimization; and
 a controller including instructions stored in a non-transitory memory that cause the controller to:
  set a temperature of the heating system in a range of 160° F. to 650° F. for a duration of 6 hours; and
  operate the milling system at a milling speed in a range of 10 revolutions per minute to 30 revolutions per minute.

12. The thermomechanochemical waste treatment system of claim 11, the instructions further cause the controller to:
 dry the waste material at the feeding system;
 feed the dried waste material to the TMC chamber from the feeding system;
 add a milling reagent to the TMC chamber;
 adjust process parameters including a temperature of the TMC chamber and a duration of milling based on characteristics of the waste material including a size distribution of particles of the waste material, a chemical composition of the waste material, and an amount of humidity in the waste material, wherein the automated process optimization includes further updating the process parameters based on output of the one or more material sensors coupled to an inlet and an outlet of the TMC chamber;
 rotate the TMC chamber about its central axis while milling the waste material;
 route a first gaseous portion of byproducts from the TMC chamber to an emissions control system by applying negative pressure at the TMC chamber and downstream of the TMC chamber;
 route a second portion of the byproducts to a recycling chamber for reuse; and
 route a third, remaining portion of the byproducts to the disposal system.

13. The thermomechanochemical waste treatment system of claim 12, wherein the one or more material sensors includes a first material sensor coupled to the inlet of the TMC chamber and a second material sensor coupled to the outlet of the TMC chamber.

14. The thermomechanochemical waste treatment system of claim 13, wherein the executable instructions stored in the non-transitory memory further cause the controller to:
 adjust the process parameters based on a first level of pollutants measured by the first material sensor and a second level of pollutants measured by the second material sensor.

15. A thermomechanochemical (TMC) waste treatment system, comprising:
 a waste pre-processing subsystem including a solid/liquid separator and a dryer;
 a TMC chamber including an inlet coupled to outlets of the waste pre-processing subsystem, wherein the TMC chamber includes a milling system, and wherein the milling system includes deaggregators;
 a heating system coupled to the TMC chamber;
 a processing reagent subsystem coupled to the TMC chamber, the processing reagent subsystem configured to deliver co-milling reagents to the TMC chamber;
 an emissions control module coupled to the TMC chamber via a vent line to receive gaseous byproducts and, wherein the emissions control module includes one or more of a granulated activated carbon (GAC) filter, a catalyst, and a thermal oxidizer (TO); and
 a controller including instructions stored in a non-transitory memory that cause the controller to:
  set a temperature of the heating system in a range of 160° F. to 650° F. for a duration of 6 hours; and
  operate the milling system at a milling speed in a range of 10 revolutions per minute to 30 revolutions per minute.

16. The thermomechanochemical waste treatment system of claim 15, wherein the TMC chamber further includes the co-milling reagents which release free radicals when interacting with the deaggregators.

17. The thermomechanochemical waste treatment system of claim 16, wherein the co-milling reagents are one or more of silica ($SiO_2$), potassium hydroxide (KOH), calcium oxide (CaO), and calcium hydroxide ($Ca(OH)_2$).

18. The thermomechanochemical waste treatment system of claim 15, further comprising a return line coupling an outlet of the emissions control module to the inlet of the TMC chamber.

\* \* \* \* \*